(12) United States Patent
Mori

(10) Patent No.: US 11,846,551 B2
(45) Date of Patent: Dec. 19, 2023

(54) PRESS SENSOR AND PRESS DETECTION DEVICE WITH SPECIFIC ELASTIC MODULI COMPONENTS

(71) Applicant: Murata Manufacturing Co., Ltd., Nagaokakyo (JP)

(72) Inventor: Kenichi Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/122,335

(22) Filed: Dec. 15, 2020

(65) Prior Publication Data

US 2021/0096033 A1   Apr. 1, 2021

Related U.S. Application Data

(63) Continuation of application No. PCT/JP2019/021527, filed on May 30, 2019.

(30) Foreign Application Priority Data

Jun. 20, 2018   (JP) .................................. 2018-116851

(51) Int. Cl.
*G01L 1/16*   (2006.01)
*G06F 3/041*   (2006.01)

(52) U.S. Cl.
CPC ............... *G01L 1/16* (2013.01); *G06F 3/041* (2013.01); *G06F 2203/04105* (2013.01)

(58) Field of Classification Search
CPC ............ C09J 9/02; H01H 2201/02; G01L 1/16
See application file for complete search history.

(56) References Cited

U.S. PATENT DOCUMENTS

| | | | |
|---|---|---|---|
| 5,410,210 A * | 4/1995 | Sato ....................... | H01L 41/113 310/800 |
| 9,276,194 B2 * | 3/2016 | Kitayama ............. | H01L 41/313 |
| 9,336,969 B2 * | 5/2016 | Takashima ............ | G06F 1/1626 |
| 9,345,134 B2 * | 5/2016 | Happoya ............... | H05K 1/0281 |
| 9,970,831 B2 * | 5/2018 | Shih .......................... | G01L 1/16 |

(Continued)

FOREIGN PATENT DOCUMENTS

| JP | 2000275114 A | 10/2000 |
|---|---|---|
| JP | 2017198573 A | 11/2017 |

(Continued)

OTHER PUBLICATIONS

International Search Report issued for PCT/JP2019/021527, dated Jun. 25, 2019.

(Continued)

*Primary Examiner* — Tran M. Tran
(74) *Attorney, Agent, or Firm* — ArentFox Schiff LLP

(57) ABSTRACT

A press sensor that includes a board, an adhesive material, and a sensor unit on a first main surface of the board with the adhesive material interposed therebetween. When an elastic modulus of the board is $E_1$, an elastic modulus of the adhesive material is $E_A$, and an elastic modulus of the sensor unit is $E_S$, $E_A<E_S$ and $E_A<E_1$.

13 Claims, 10 Drawing Sheets

(56) References Cited

U.S. PATENT DOCUMENTS

| | | | | |
|---|---|---|---|---|
| 10,024,739 | B2* | 7/2018 | Kawamura | G01L 1/16 |
| 10,197,460 | B2* | 2/2019 | Kawamura | H01L 41/1132 |
| 10,305,017 | B2* | 5/2019 | Kondo | H10N 30/883 |
| 10,309,844 | B2* | 6/2019 | Kawamura | C09J 133/00 |
| 10,620,757 | B2* | 4/2020 | Taka | G06F 1/1671 |
| 10,627,929 | B2* | 4/2020 | Kano | G06F 3/04144 |
| 10,807,783 | B2* | 10/2020 | Bahar | G01L 1/247 |
| 10,928,263 | B2* | 2/2021 | Hosokawa | G01L 9/0052 |
| 2015/0292963 | A1* | 10/2015 | Kawamura | G06F 3/0412 |
| | | | | 345/87 |
| 2016/0169753 | A1* | 6/2016 | Kawamura | C09J 201/00 |
| | | | | 73/774 |
| 2017/0024048 | A1* | 1/2017 | Kihara | G01L 1/16 |

FOREIGN PATENT DOCUMENTS

| | | | | |
|---|---|---|---|---|
| WO | WO-2016194690 | A1* | 12/2016 | G01L 1/16 |
| WO | 2017051865 | A1 | 3/2017 | |

OTHER PUBLICATIONS

Written Opinion of the International Searching Authority issued for PCT/JP2019/021527, dated Jun. 25, 2019.

* cited by examiner

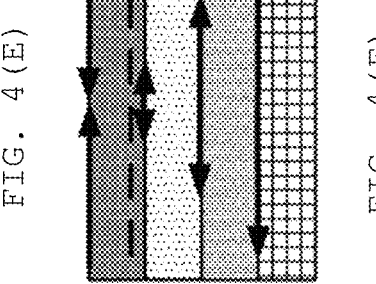
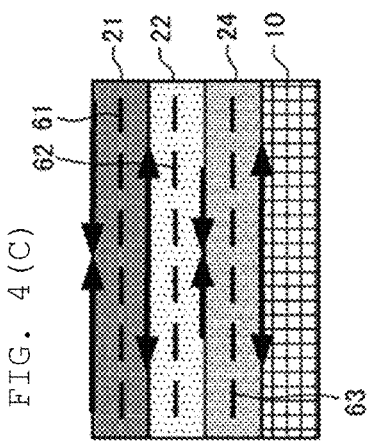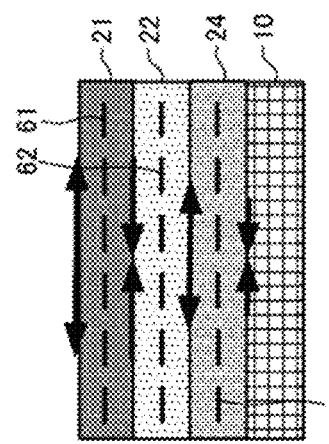
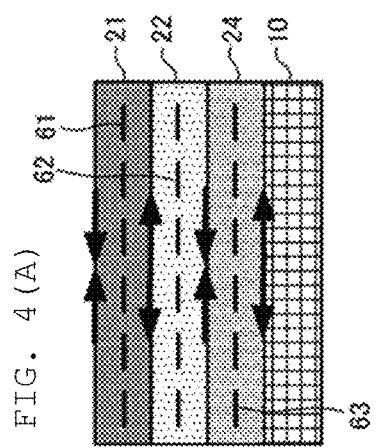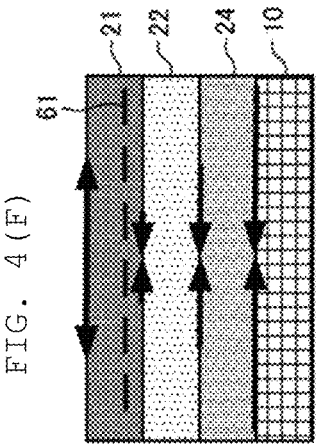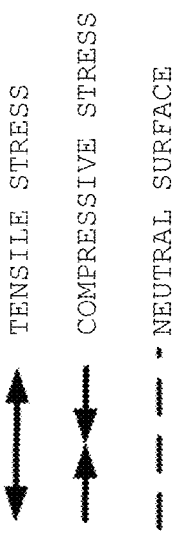
FIG. 4(A)  FIG. 4(C)  FIG. 4(E)
FIG. 4(B)  FIG. 4(D)  FIG. 4(F)

PRESS SENSOR AND PRESS DETECTION DEVICE WITH SPECIFIC ELASTIC MODULI COMPONENTS

CROSS REFERENCE TO RELATED APPLICATIONS

The present application is a continuation of International application No. PCT/JP2019/021527, filed May 30, 2019, which claims priority to Japanese Patent Application No. 2018-116851, filed Jun. 20, 2018, the entire contents of each of which are incorporated herein by reference.

FIELD OF THE INVENTION

The present invention relates to a press sensor that detects pressing, and a press detection device that uses the press sensor.

BACKGROUND OF THE INVENTION

Patent Document 1 discloses a press sensor that is fixed to a support board with a laminating material interposed therebetween, in a pressure detector (refer to Patent Document 1). An adhesive agent used for the laminating material may become difficult to handle later because the adhesive agent may be used by curing or may solidify over time. Therefore, instead of the adhesive agent, an adhesive may be used as the laminating material.

When a user presses the surface side of the support board described in Patent Document 1, the surface side of the support board is contracted and at the same time the back surface side of the support board is elongated. Here, in a case where an adhesive layer in contact with the support board is hard, the elongation generated on the back surface side of the support board is directly transmitted through the adhesive layer, and the entire adhesive layer is elongated. Therefore, the press sensor fixed to the support board with the adhesive layer interposed therebetween is also elongated. At this time, the farther the press sensor is from the surface of the support board pressed by the user, the greater the elongation generated. On the other hand, when the user releases his/her hand from the surface side of the support board described in Patent Document 1, the surface side of the support board is elongated and at the same time the back surface side of the support board is contracted. In this case, the contraction is transmitted to the press sensor as opposed to when the user presses the surface side of the support board.

Patent Document 1: Japanese Patent Application Laid-Open No. 2017-198573

SUMMARY OF THE INVENTION

The adhesive layer is a so-called viscoelastic body. The viscoelastic body is deformed by a force applied from the outside. At this time, stress relaxation exerts a force on the viscoelastic body to restore the deformation generated in the viscoelastic body to the original state. Hereinafter, the action of the force in the opposite direction to restore the deformation generated in the viscoelastic body to the original state will be described as "rebound". The magnitude of the rebound force is proportional to the magnitude of the deformation occurring in the viscoelastic body.

In a case where the press sensor described in Patent Document 1 is fixed to the support board using an adhesive layer, if the adhesive layer is hard, the elongation generated in the press sensor becomes large as described above. Therefore, the rebound generated in the press sensor becomes large. At this time, since the rebound is a force in the contracting direction, the rebound is in the opposite direction to the elongation generated in the press sensor. Therefore, the voltage detected by the press sensor due to the rebound has a polarity opposite to the voltage detected by the press sensor when the user presses the surface side of the support board described in Patent Document 1. On the other hand, when the user releases his/her hand from the surface side of the support board described in Patent Document 1, the press sensor is contracted. Therefore, the polarity of the voltage detected by the press sensor when the user releases his/her hand from the surface side of the support board is the same as that of the voltage detected by the press sensor due to the rebound when the user presses the surface side of the support board. Therefore, in a case where the rebound becomes large, there is a risk of false detection that the user has released his/her hand due to the rebound even though the user has not released his/her hand from the surface side of the support board.

Therefore, an object of an embodiment of the present invention is to provide a press sensor, a press detection device, and an electronic device which are less affected by stress relaxation even in a case where an adhesive layer is used, and can suppress false detection by suppressing the rebound to a small extent.

A press sensor according to an embodiment of the invention includes a board; an adhesive layer; and a sensor unit on a first main surface of the board with the adhesive layer interposed therebetween. When an elastic modulus of the board is $E_1$, an elastic modulus of the adhesive layer is $E_A$, and an elastic modulus of the sensor unit is $E_S$, $E_A < E_S$ and $E_A < E_1$.

During a pressing operation of the press sensor, one neutral surface of a stress against distortion in a stacking direction of the board, the adhesive layer, and the sensor unit is present in each of the board, the adhesive layer, and the sensor unit.

When an elastic modulus of the adhesive layer is $E_A$, the elastic modulus $E_A$ is preferably $7 \times 10^3$ Pa $\leq E_A \leq \times 10^5$ Pa.

Under the above conditions, the influence of the rebound is suppressed. Therefore, the press sensor is less affected by the stress relaxation and can suppress false detection.

A press detection device according to an embodiment of the invention includes the above-described press sensor; and a housing in which the press sensor is arranged.

In this configuration, the press detection device includes the above-described press sensor. Therefore, the press detection device is less affected by the stress relaxation, and can suppress false detection by suppressing the rebound.

The press sensor according to the embodiment of the invention is less affected by the stress relaxation of the adhesive layer even in a case where the adhesive layer is used, and can suppress false detection by suppressing the rebound.

BRIEF EXPLANATION OF THE DRAWINGS

FIGS. 4(A) to 4(F) are diagrams for describing a stress generated in the press sensor 111 according to the first embodiment.

DETAILED DESCRIPTION OF THE INVENTION

Hereinafter, a press sensor and a press detection device according to embodiments of the present invention will be described.

Figure 1A:
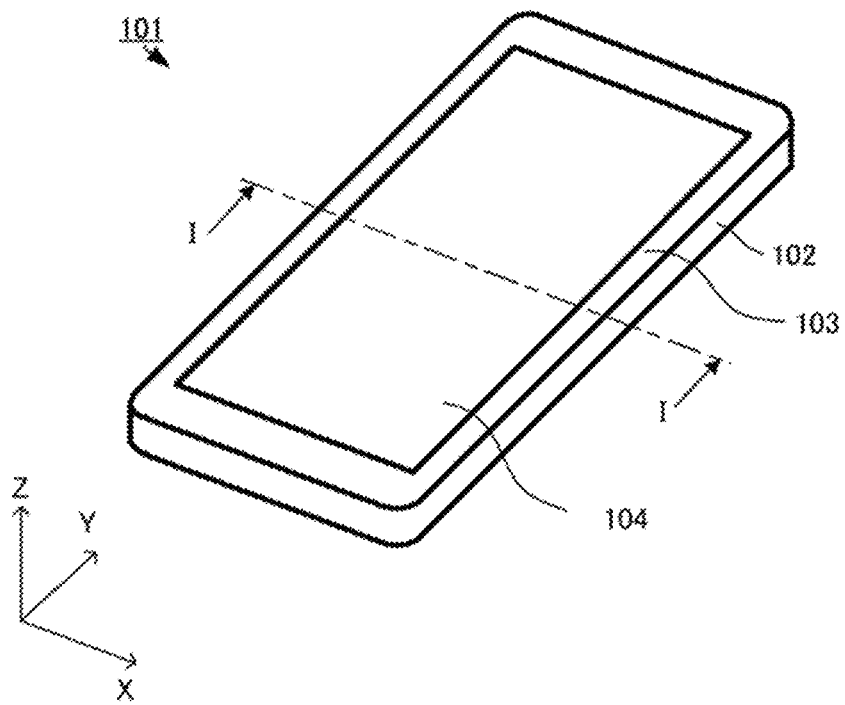
FIG. 1(A) is a perspective view of an electronic device 101 including a press sensor 111 according to a first embodiment.
Figure 1B:
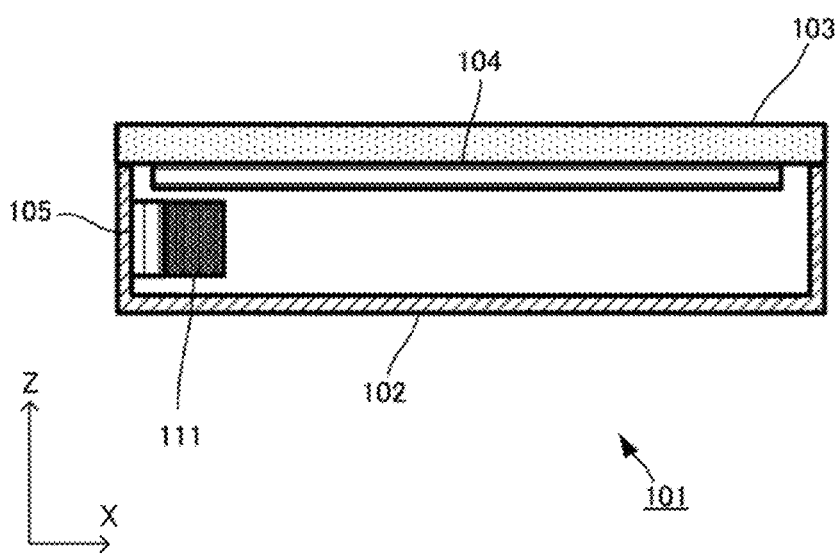
FIG. 1(B) is a sectional view thereof.
Figure 2:
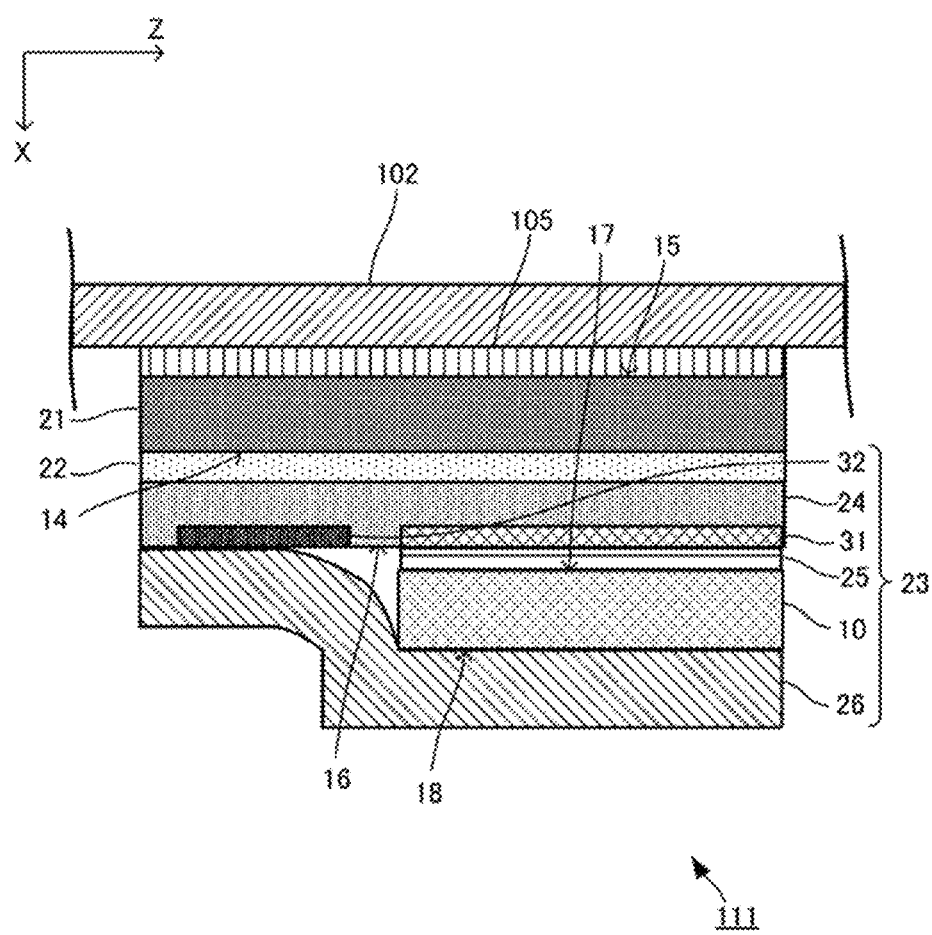
FIG. 2 is a schematic view for describing a section of the press sensor 111 according to the first embodiment.
Figure 3:
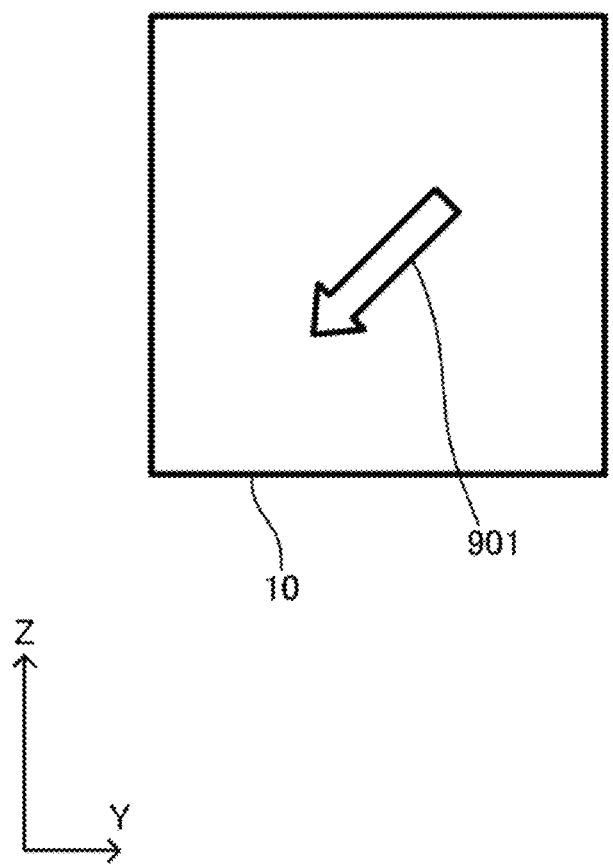
FIG. 3 is a diagram for describing a piezoelectric film 10 according to the first embodiment.

FIG. 1(A) is a perspective view of an electronic device 101 including a press sensor 111 according to a first embodiment, and FIG. 1(B) is a sectional view of FIG. 1(A) taken along line I-I. FIG. 2 is a schematic view for describing a section of the press sensor 111. FIG. 3 is a diagram for describing a piezoelectric film 10 according to the first embodiment. The electronic device 101 illustrated in FIG. 1(A) is an example of a "press detection device" according to the present invention, and can be appropriately changed according to the specifications without being limited thereto. Further, in each drawing, wiring and the like are not illustrated for convenience of description.

As illustrated in FIG. 1(A), the electronic device 101 includes a substantially rectangular parallelepiped housing 102 having an open upper surface. The electronic device 101 includes a flat surface panel 103 arranged to seal an opening on the upper surface of the housing 102. The surface panel 103 functions as an operation surface on which a user performs a touch operation using a finger, a pen, or the like. Hereinafter, the width direction (lateral direction) of the housing 102 is described as an X direction, the length direction (longitudinal direction) of the housing 102 is described as a Y direction, and the thickness direction of the housing 102 is described as a Z direction.

As illustrated in FIG. 1(B), the electronic device 101 includes a display unit 104, a laminating material 105, and the press sensor 111 on an inner side of the housing 102. The display unit 104 is formed on a surface of the surface panel 103 on the inner side of the housing 102. The press sensor 111 is detachably attached to an inner side wall of the housing 102 using the laminating material 105. The position where the press sensor 111 is attached is not limited to the side wall. For example, the position may be a surface of the display unit 104 on a side opposite to the surface panel 103, or the bottom surface of the housing 102.

As illustrated in FIG. 2, the press sensor 111 includes a reinforcing plate 21, an adhesive material 22, and a sensor unit 23. The reinforcing plate 21, the adhesive material 22, and the sensor unit 23 are laminated in this order from the housing 102 side. The adhesive material 22 is an example of an "adhesive layer" according to the present invention.

The sensor unit 23 is arranged on a first main surface 14 of the reinforcing plate 21 with the adhesive material 22 interposed therebetween. A second main surface 15 of the reinforcing plate 21 on a side opposite to the first main surface 14 is attached to the housing 102 with the laminating material 105 interposed therebetween. The reinforcing plate 21 is made of a metal material. As a result, the reinforcing plate 21 has a certain level of strength, and can suppress noise from the housing 102 side as will be described later. The reinforcing plate 21 is an example of a "board" in the present invention.

The sensor unit 23 includes the piezoelectric film 10, a signal electrode 31, a ground electrode 32, a sensor substrate 24, an adhesion layer 25, and a shield electrode 26.

In the sensor unit 23, the sensor substrate 24, the adhesion layer 25, the piezoelectric film 10, and the shield electrode 26 are laminated in this order from the adhesive material 22 side. The sensor substrate 24 is arranged closer to the adhesive material 22 side than the piezoelectric film 10. The sensor substrate 24 is a target for detecting distortion applied to the electronic device 101.

The piezoelectric film 10 is arranged on a first main surface 16 of the sensor substrate 24. The adhesion layer 25 adheres the piezoelectric film 10 and the sensor substrate 24. The piezoelectric film 10 has a first main surface 17 and a second main surface 18. The signal electrode 31 and the ground electrode 32 are arranged on the first main surface 16 of the sensor substrate 24. The signal electrode 31 is arranged on the first main surface 17 side of the piezoelectric film 10 facing the sensor substrate 24. The ground electrode 32 is arranged at a position on the sensor substrate 24 where the piezoelectric film 10 is not arranged. That is, when the sensor unit 23 is viewed in a plan view, the signal electrode 31 and the ground electrode 32 are arranged so as not to overlap each other. As a result, a short circuit in the signal electrode 31 and the ground electrode 32 can be suppressed.

The shield electrode 26 is arranged on the second main surface 18 of the piezoelectric film 10. The shield electrode 26 is in contact with the ground electrode 32 at a position where the shield electrode 26 is not in contact with the piezoelectric film 10. The shield electrode 26 connects the second main surface 18 of the piezoelectric film 10 and the ground electrode 32. As a result, the shield electrode 26 can suppress the influence of noise from the outside of the piezoelectric film 10.

Next, the piezoelectric film 10 will be described. FIG. 3 is a plan view of the piezoelectric film 10. As illustrated in FIG. 3, the piezoelectric film 10 may be a film formed of a chiral polymer. In the first embodiment, polylactic acid (PLA), particularly L-type polylactic acid (PLLA), is used as the chiral polymer. The PLLA formed of a chiral polymer has a main chain having a helical structure. The PLLA has piezoelectricity when the PLLA is uniaxially stretched and the molecules are oriented. Then, the uniaxially stretched PLLA generates a voltage when the flat plate surface of the piezoelectric film 10 is pressed. At this time, the amount of voltage generated depends on a displacement rate at which the flat plate surface is displaced in a direction orthogonal to the flat plate surface by pressing, that is, a time change of displacement (differential value of a displacement amount with respect to time).

In the first embodiment, the uniaxial stretching direction of the piezoelectric film 10 (PLLA) is a direction forming an angle of 45 degrees with respect to the Y direction and the Z direction, as illustrated by arrow 901 in FIG. 3. An angle including, for example, about 45 degrees±10 degrees is included in the 45 degrees. Therefore, when the piezoelectric film 10 is elongated or contracted in the Y direction or the Z direction, the piezoelectric film 10 generates an electric charge. As a result, a voltage is generated by the piezoelectric film 10 being pressed.

The PLLA is subjected to orientation processing of molecules by stretching to generate piezoelectricity, and therefore does not need to be subjected to a poling treatment unlike other polymers such as PVDF or piezoelectric ceramics. That is, the piezoelectricity of PLLA, which does not belong to a ferroelectric substance, is not expressed by polarization of ions unlike a ferroelectric substance such as PZT or PVDF, and is derived from a helical structure which is a characteristic structure of a molecule. Therefore, PLLA does not have pyroelectricity generated by other ferroelectric piezoelectric materials. PLLA is suitable for the press sensor 111 because PLLA does not have pyroelectricity and is not affected by the temperature or frictional heat of the user's finger. Further, the piezoelectric constant of PVDF and the like is changed over time, and in some cases, the piezoelectric constant is significantly decreased, but the piezoelectric constant of PLLA is extremely stable over time. Therefore, it is possible to detect displacement due to pressing with high sensitivity without being affected by the surrounding environment.

In addition, the piezoelectric film 10 may be made of a film formed of a ferroelectric substance such as PZT in which ions are polarized, or PVDF that has been subjected to the poling treatment, instead of PLLA.

As the signal electrode 31, the ground electrode 32 or the shield electrode 26 formed on the main surface of the piezoelectric film 10, a metal-based electrode such as aluminum or copper can be used. By providing such a signal electrode 31, a ground electrode 32, or a shield electrode 26, the electric charge generated by the piezoelectric film 10 can be acquired as a voltage, and a press amount detection signal having a voltage value corresponding to the press amount can be output to the outside.

The laminating material 105 for attaching the press sensor 111 to the housing 102 is a viscoelastic body. When the user applies a load to the press sensor 111 and the user finishes applying the load, stress relaxation of the laminating material 105 exerts a force on the press sensor 111 to restore the deformation generated in the press sensor 111 to the original state. In the present embodiment, the action of the force in the opposite direction to return the deformation generated in the press sensor 111 to the original state is referred to as "rebound".

FIGS. 4(A), 4(C), and 4(E) are diagrams for describing a stress generated in the press sensor 111 when the user starts pressing the press sensor 111. FIGS. 4(B), 4(D), and 4(F) are diagrams for describing a stress generated in the press sensor 111 when the user finishes pressing the press sensor 111. FIGS. 4(A) and 4(B) are diagrams illustrating a case where an elastic modulus $E_A$ of the adhesive material 22 satisfies $E_A<7\times10^3$ Pa. FIGS. 4(C) and 4(D) are diagrams illustrating a case where the elastic modulus $E_A$ of the adhesive material 22 satisfies $7\times10^3$ Pa$\leq E_A \leq 5\times10^5$ Pa. FIGS. 4(E) and 4(F) are diagrams illustrating a case where the elastic modulus $E_A$ of the adhesive material 22 satisfies $E_A>5\times10^5$ Pa. In addition, in FIGS. 4(A) to 4(F), only a part of the press sensor 111 is illustrated.

As illustrated in FIGS. 4(A) and 4(C), when the user starts pressing the press sensor 111, the surface of the reinforcing plate 21 is contracted and a compressive stress is generated. When the user starts pressing the press sensor 111, elongation (tensile stress) is generated on the adhesive material 22 side of the reinforcing plate 21 against the compressive stress generated on the surface of the reinforcing plate 21. At this time, a neutral surface 61 of a stress in which the tensile stress and the compressive stress are in equilibrium is generated inside the reinforcing plate 21.

In a case where the elastic modulus $E_A$ of the adhesive material 22 satisfies $E_A<7\times10^3$ Pa, the adhesive material 22 is highly flexible. In a case where the elastic modulus $E_A$ of the adhesive material 22 satisfies $7\times10^3$ Pa$\leq E_A \leq 5\times10^5$ Pa, the adhesive material 22 has an appropriate hardness. Since the adhesive material 22 is highly flexible or has an appropriate hardness, the tensile stress generated on the reinforcing plate 21 side of the adhesive material 22 is not maintained inside the adhesive material 22. Therefore, a compressive stress in the opposite direction is generated on the sensor substrate 24 side of the adhesive material 22. At this time, a neutral surface 62 of the stress is generated inside the adhesive material 22. The compressive stress generated on the sensor substrate 24 side of the adhesive material 22 is not maintained inside the sensor substrate 24, and a tensile stress is generated on the sensor substrate 24 side of the piezoelectric film 10. At this time, a neutral surface 63 of the stress is generated inside the sensor substrate 24.

As described above, the neutral surface 61, the neutral surface 62, and the neutral surface 63 of the stress are generated in the reinforcing plate 21, the adhesive material 22, and the sensor substrate 24, respectively. The neutral surface 63 of the stress generated in the sensor substrate 24 is close to the piezoelectric film 10. The magnitude of the generated displacement amount (stress) depends on the distance from the neutral surface. That is, since the neutral surface is present in the sensor unit 23 itself, the neutral surface of a stress is closer to the piezoelectric film 10 than the reinforcing plate 21 side. Therefore, the rebound when the press sensor 111 receives the operation is suppressed to be small.

On the other hand, as illustrated in FIGS. 4(B) and 4(D), when the user finishes pressing the press sensor 111, the tensile stress due to the stress relaxation becomes dominant on the surface of the reinforcing plate 21. A compressive stress is generated on the adhesive material 22 side of the reinforcing plate 21 against the tensile stress generated on the surface of the reinforcing plate 21. At this time, the neutral surface 61 is generated inside the reinforcing plate 21. Since the adhesive material 22 is highly flexible or has an appropriate hardness, the compressive stress generated on the reinforcing plate 21 side of the adhesive material 22 is not maintained inside the adhesive material 22. Therefore, a tensile stress in the opposite direction is generated on the sensor substrate 24 side of the adhesive material 22. At this time, the neutral surface 62 of the stress is generated inside the adhesive material 22. The tensile stress generated on the sensor substrate 24 side of the adhesive material 22 is not maintained inside the sensor substrate 24, and a compressive stress is generated on the sensor substrate 24 side of the piezoelectric film 10. At this time, the neutral surface 63 is generated inside the sensor substrate 24.

As described above, the neutral surface 61, the neutral surface 62, and the neutral surface 63 of the stress are generated in the reinforcing plate 21, the adhesive material 22, and the sensor substrate 24, respectively. The neutral surface 63 of the stress generated in the sensor substrate 24 is close to the piezoelectric film 10. Therefore, when the user finishes pressing the press sensor 111, the compressive stress generated in the piezoelectric film 10 due to the stress relaxation becomes small.

On the other hand, as illustrated in FIG. 4(E), when the user starts pressing the press sensor 111, a compressive stress is generated on the surface of the reinforcing plate 21. A tensile stress is generated on the adhesive material 22 side of the reinforcing plate 21 against the compressive stress generated on the surface of the reinforcing plate 21. In a case where the elastic modulus of the adhesive material 22 satisfies $E_A > 5 \times 10^5$ Pa, the adhesive material 22 is hard. Therefore, the tensile stress generated on the reinforcing plate 21 side of the adhesive material 22 due to the stress relaxation is transmitted inside the adhesive material 22, and a tensile stress is generated on the sensor substrate 24 side of the adhesive material 22. The tensile stress generated on the sensor substrate 24 side of the adhesive material 22 is further transmitted inside the sensor substrate 24, and a tensile stress is generated on the sensor substrate 24 side of the piezoelectric film 10.

At this time, the neutral surface 61 of the stress is generated in the reinforcing plate 21 to be in the vicinity of the adhesive material 22. Since the magnitude of the generated stress depends on the distance from the neutral surface, in the press sensor 111, the generated tensile stress increases from the adhesive material 22 toward the piezoelectric film 10.

Then, as illustrated in FIG. 4(F), when the user finishes pressing the press sensor 111, the tensile stress due to the stress relaxation becomes dominant on the surface of the reinforcing plate 21. A compressive stress is generated on the adhesive material 22 side of the reinforcing plate 21 against the tensile stress generated on the surface of the reinforcing plate 21. In a case where the elastic modulus $E_A$ of the adhesive material 22 satisfies $E_A > 5 \times 10^5$ Pa, the adhesive material 22 is hard, so that the compressive stress generated on the reinforcing plate 21 side of the adhesive material 22 due to the stress relaxation is transmitted inside the adhesive material 22 and a compressive stress is generated on the sensor substrate 24 side of the adhesive material 22. The compressive stress generated on the sensor substrate 24 side of the adhesive material 22 is further transmitted inside the sensor substrate 24, and a compressive stress is generated on the sensor substrate 24 side of the piezoelectric film 10. At this time, the neutral surface 61 of the stress is generated in the reinforcing plate 21 to be in the vicinity of the adhesive material 22.

In this case, in the press sensor 111, the generated compressive stress increases from the adhesive material 22 toward the piezoelectric film 10. Therefore, when the user finishes pressing the press sensor 111, the compressive stress generated in the piezoelectric film 10 due to the stress relaxation becomes large.

Here, in the elastic modulus $E_A$ of the adhesive material 22, the tensile stress generated in the piezoelectric film 10 at the start of pressing the press sensor 111 and the compressive stress generated in the piezoelectric film 10 at the end of pressing the press sensor 111 are compared. In a case where the elastic modulus $E_A$ of the adhesive material 22 satisfies $7 \times 10^3$ Pa $\leq E_A \leq 2 \times 10^5$ Pa, a ratio of the compressive stress generated in the piezoelectric film 10 at the end of pressing the press sensor 111 to the tensile stress generated in the piezoelectric film 10 at the start of pressing the press sensor 111 is small. In a case where the elastic modulus $E_A$ of the adhesive material 22 satisfies $E_A < 7 \times 10^3$ Pa, a ratio of the compressive stress generated in the piezoelectric film 10 at the end of pressing the press sensor 111 to the tensile stress generated in the piezoelectric film 10 at the start of pressing the press sensor 111 is larger than that in the case where the elastic modulus $E_A$ of the adhesive material 22 satisfies $7 \times 10^3$ Pa $\leq E_A \leq 5 \times 10^5$ Pa. In a case where the elastic modulus $E_A$ of the adhesive material 22 satisfies $E_A > 5 \times 10^5$ Pa, a ratio of the compressive stress generated in the piezoelectric film 10 at the end of pressing the press sensor 111 to the tensile stress generated in the piezoelectric film 10 at the start of pressing the press sensor 111 is larger than that in the case where the elastic modulus $E_A$ of the adhesive material 22 satisfies $7 \times 10^3$ Pa $\leq E_A \leq 5 \times 10^5$ Pa. On the other hand, in the case where the elastic modulus $E_A$ of the adhesive material 22 satisfies $7 \times 10^3$ Pa $\leq E_A \leq 5 \times 10^5$ Pa, the influence of the adhesive material 22 on the press sensor 111 is smaller than that in the case where the elastic modulus $E_A$ of the adhesive material 22 satisfies $E_A < 7 \times 10^3$ Pa. Therefore, in a case where the elastic modulus $E_A$ of the adhesive material 22 satisfies $7 \times 10^3$ Pa $\leq E_A \leq 5 \times 10^5$ Pa, the ratio of the compressive stress generated in the piezoelectric film 10 at the end of pressing the press sensor 111 to the tensile stress generated in the piezoelectric film 10 at the start of pressing the press sensor 111 becomes smaller than that in the case where the elastic modulus $E_A$ of the adhesive material 22 satisfies $E_A < 7 \times 10^3$ Pa.

As described above, the ratio of the compressive stress generated in the piezoelectric film 10 at the end of pressing the press sensor 111 to the tensile stress generated in the piezoelectric film 10 at the start of pressing the press sensor 111 is increased in the order of the case where the elastic modulus $E_A$ of the adhesive material 22 satisfies $7 \times 10^3$ Pa $\leq E_A \leq 5 \times 10^5$ Pa, the case where the elastic modulus $E_A$ of the adhesive material 22 satisfies $E_A > 5 \times 10^5$ Pa, and the case where the elastic modulus $E_A$ of the adhesive material 22 satisfies $E_A < 7 \times 10^3$ Pa. Therefore, in the case where the elastic modulus $E_A$ of the adhesive material 22 satisfies $7 \times 10^3$ Pa $\leq E_A \leq 5 \times 10^5$ Pa, the press sensor 111 can suppress the influence of stress relaxation most.

Further, even in a case where the neutral surface 61, the neutral surface 62, and the neutral surface 63 of a stress are generated in the reinforcing plate 21, the adhesive material 22, and the sensor substrate 24 that is a part of the sensor unit 23, respectively, the ratio of the compressive stress generated in the piezoelectric film 10 at the end of pressing the press sensor 111 to the tensile stress generated in the piezoelectric film 10 at the start of pressing the press sensor 111 is small. Therefore, the compressive stress generated in the piezoelectric film 10 due to the stress relaxation becomes relatively small, and the press sensor 111 can suppress the influence of stress relaxation.

Here, using FIG. 4(D), a case will be described in which $E_1$, $E_A$, and $E_S$ satisfy $E_A < E_S$ and $E_A < E_1$ when the elastic modulus of the reinforcing plate 21 is set as $E_1$, the elastic modulus of the adhesive material 22 is set as $E_A$, and the elastic modulus of the sensor unit 23 is set as $E_S$. The elastic modulus of the adhesive material 22 is smaller than those of the reinforcing plate 21 and the sensor substrate 24 that is a part of the sensor unit 23. In this case, since the elastic modulus of the adhesive material 22 is smaller than the elastic modulus of the reinforcing plate 21, as illustrated in FIG. 4(C), a compressive stress is generated on the adhesive material 22 side of the reinforcing plate 21 against the tensile stress generated on the surface of the reinforcing plate 21. The compressive stress generated on the adhesive material 22 side of the reinforcing plate 21 is not maintained inside the adhesive material 22. Therefore, a tensile stress in the opposite direction is generated on the sensor substrate 24 side of the adhesive material 22. Since the elastic modulus of the sensor substrate 24 is larger than the elastic modulus of the adhesive material 22, a compressive stress is generated on the piezoelectric film 10 side of the sensor substrate 24 against the tensile stress generated on the adhesive material 22 side of the sensor substrate 24. Therefore, a compressive stress is generated on the sensor substrate 24 side of the piezoelectric film 10.

Also in this case, the neutral surface 61, the neutral surface 62, and the neutral surface 63 of a stress are generated in the reinforcing plate 21, the adhesive material 22, and the sensor substrate 24 that is a part of the sensor unit 23, respectively. That is, the neutral surface of a stress is closer to the piezoelectric film 10 than the reinforcing plate 21 side. In a case where the neutral surface is closer than the reinforcing plate 21 side, the compressive stress generated in the sensor unit 23 when pressing the press sensor 111 is finished becomes smaller than the tensile stress. The compressive stress generated in the piezoelectric film 10 at the end of pressing the press sensor 111 is smaller than the tensile stress generated in the piezoelectric film 10 at the start of pressing the press sensor 111. Therefore, the compressive stress generated in the piezoelectric film 10 due to the stress relaxation becomes small, and the press sensor 111 can suppress the influence of stress relaxation.

Figure 5:
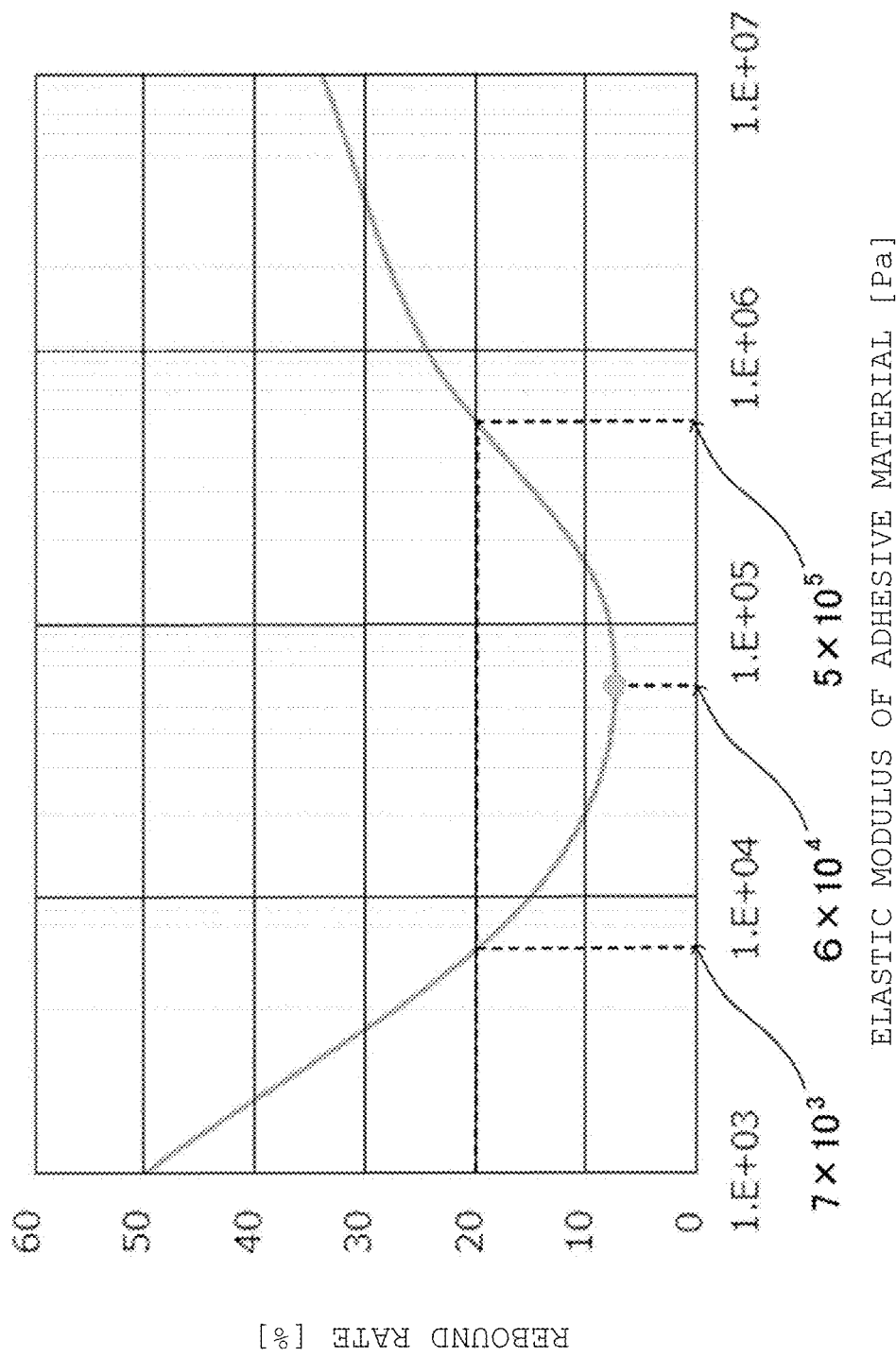
FIG. 5 is a graph illustrating a relationship between an elastic modulus of an adhesive material 22 according to the first embodiment and a rebound rate of an output.
Figure 6:
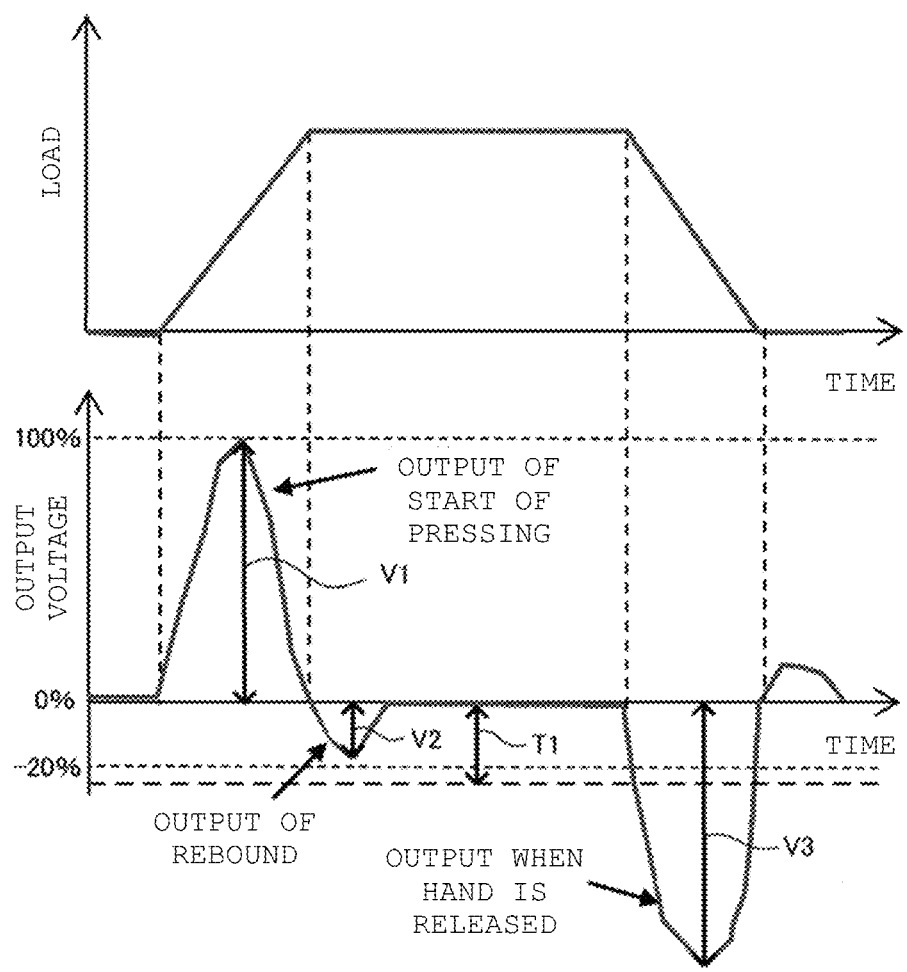
FIG. 6 is a diagram for describing an output voltage in a case where a load is applied to the press sensor 111 according to the first embodiment.

FIG. 5 is a graph illustrating a relationship between the elastic modulus of the adhesive material 22 according to the first embodiment and a rebound rate of an output. FIG. 6 is a diagram for describing an output voltage in a case where a load is applied to the press sensor 111 according to the first embodiment.

Here, the rebound rate will be described. In a case where the user applies a predetermined load to the press sensor 111, the press sensor 111 is deformed. As a result, the piezoelectric film 10 is deformed, and a voltage V1 corresponding to the predetermined load is generated. When the piezoelectric film 10 is deformed, rebound occurs in the press sensor 111 due to the stress relaxation. Due to the rebound, the piezoelectric film 10 is deformed in the opposite direction to the case where the user applies the load to the press sensor 111. Therefore, the piezoelectric film 10 generates a voltage V2 in the opposite direction to that in the case where the user applies the load to the press sensor 111. The rebound rate is a ratio of the magnitude of the voltage V2 in the opposite direction generated due to the rebound to the magnitude V1 of the voltage generated in the case where the user applies the predetermined load to the press sensor 111. Hereinafter, the relationship between the elastic modulus of the adhesive material 22 and a rebound rate of an output will be described.

The elastic modulus $E_A$ of the adhesive material 22 satisfies $7 \times 10^3$ Pa $\leq E_A \leq 2 \times 10^5$ Pa. As illustrated in FIG. 5, in a case where the elastic modulus $E_A$ of the adhesive material 22 satisfies $7 \times 10^3$ Pa $\leq E_A \leq 2 \times 10^5$ Pa, the rebound rate of the output is 20% or less. That is, assuming that the voltage V1 generated when the user starts pressing the press sensor 111 is 100%, the voltage V2 generated due to the rebound is 20% or less of the voltage V1. As illustrated in FIG. 6, in a case where the user applies the load to the press sensor 111, the press sensor 111 rebounds and outputs the voltage V2 having the opposite polarity to that in a case where the user applies the load to the press sensor 111. In the adhesive material 22, the rebound rate is lowest when the elastic modulus $E_A$ is $6 \times 10^4$ Pa.

Further, since the rebound rate of the output is 20% or less, when a threshold value T1 is set to 20% in advance, in a case where the value of the voltage V2 in the opposite direction to the value of the voltage V1 is the threshold value T1 or less, it can be determined that the voltage is the output voltage generated due to the rebound. Therefore, in a case where the user applies the load to the press sensor 111, the influence of the rebound on the normal value output by the press sensor 111 can be suppressed.

Further, in a case where the user releases his/her hand from the press sensor 111 so that the load applied to the press sensor 111 by the user becomes smaller, the press sensor 111 outputs a voltage V3 having the opposite polarity to that in a case where the user applies the load to the press sensor 111, as illustrated in FIG. 6. In this case, the output voltage V3 having the opposite polarity has substantially the same magnitude as that of the output voltage V1 in a case where the user applies the load to the press sensor 111. Therefore, the output voltage V3 output by the press sensor 111 when the user releases his/her hand is sufficiently larger than the output voltage V2 generated due to the rebound. That is, the output voltage V3 is detected to be larger than the threshold value T1. Therefore, since the output voltage V2 generated due to the rebound and the output voltage V3 output by the press sensor 111 when the user releases his/her hand can be discriminated, erroneous determination due to the rebound can be prevented. That is, in a case where the elastic modulus $E_A$ of the adhesive material 22 satisfies $7 \times 10^3$ Pa $\leq E_A \leq 5 \times 10^5$ Pa, the adhesive material 22 has a predetermined rigidity, and the output of the rebound with respect to the regular output of the press sensor 111 is 20% or less. Therefore, the influence of the rebound is suppressed. Therefore, the press sensor 111 is less affected by the adhesive material 22 and can suppress false detection.

Figure 7:
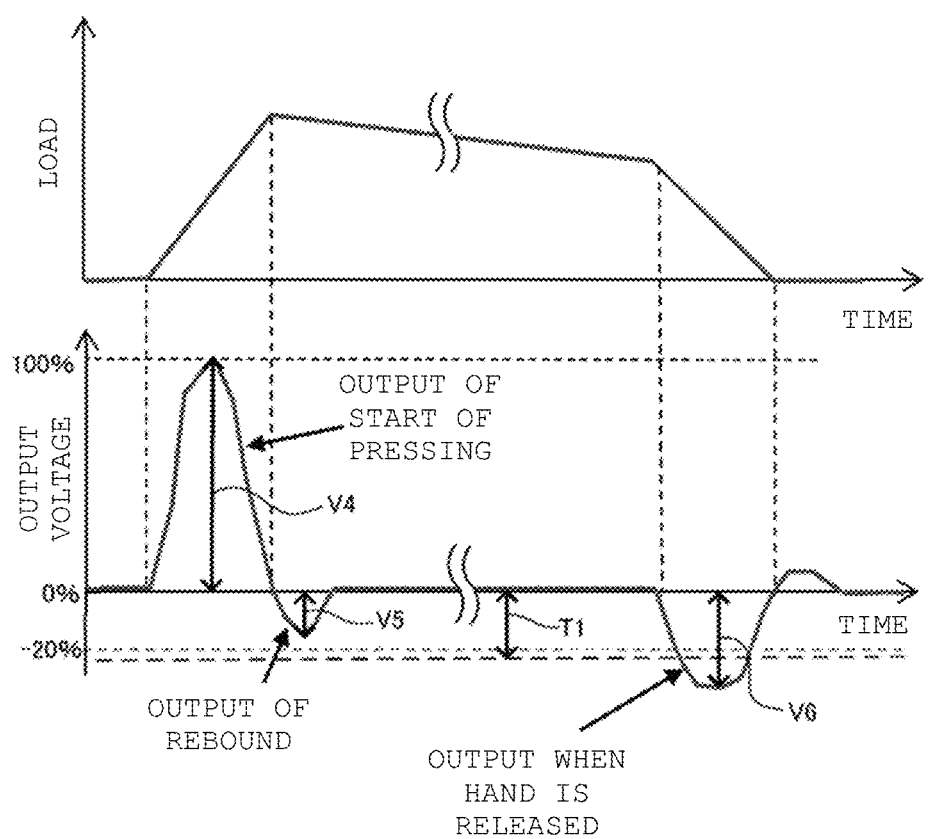
FIG. 7 is a diagram for describing a stress generated in a case where a user presses and holds the press sensor 111 according to the first embodiment.

FIG. 7 is a diagram for describing a stress generated in a case where the user presses and holds the press sensor 111 according to the first embodiment. When the user presses and holds the press sensor 111, the load applied to the press sensor 111 by the user gradually decreases from the time when the user starts pressing, as illustrated in FIG. 7. Therefore, the output when the user releases the press sensor 111 becomes small. For example, an output voltage V6 when the user releases his/her hand from the press sensor 111 is about 40% of an output voltage V4 when the user starts pressing the press sensor 111. The output when the user releases his/her hand from the press sensor 111 more slowly than this case is reduced to about 30% of the output when the user starts pressing the press sensor 111.

In the press sensor 111, the rebound rate of the output is 20% or less. When the threshold value T1 is set to 20% in advance, the value of the voltage V6 and the value of the voltage V5 can be determined with the threshold value T1 as a boundary. It is understood that in a case where the output voltage is equal to or less than the threshold value T1, the voltage is caused by the rebound, and in a case where the output voltage is larger than the threshold value T1, the voltage is an output voltage when the user releases his/her hand from the press sensor 111. Therefore, even in a case where the user presses and holds the press sensor 111, the output voltage V5 having the opposite polarity due to the rebound is smaller than the output voltage V6 having the opposite polarity generated when the user releases his/her hand from the press sensor 111 after pressing and holding the press sensor 111. Therefore, even when the press sensor 111 is pressed and held, since the press sensor 111 can discriminate between the output voltage V5 due to the rebound and the output voltage V6 when the user releases his/her hand from the press sensor 111, erroneous determination due to the rebound can be prevented.

Figure 8:
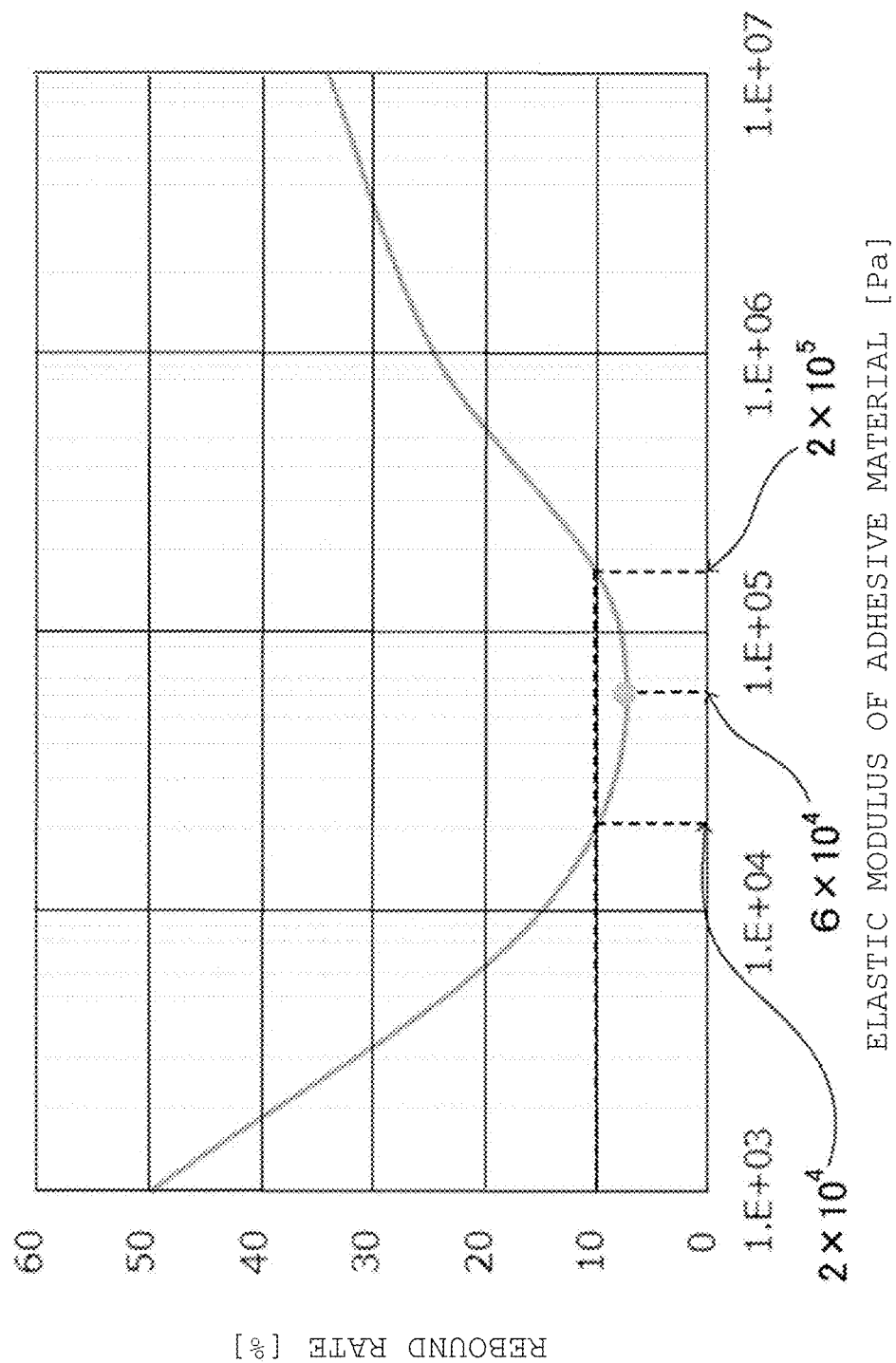
FIG. 8 is a graph illustrating a relationship between an elastic modulus of an adhesive material 22 according to a second embodiment and a rebound rate of an output.
Figure 9:
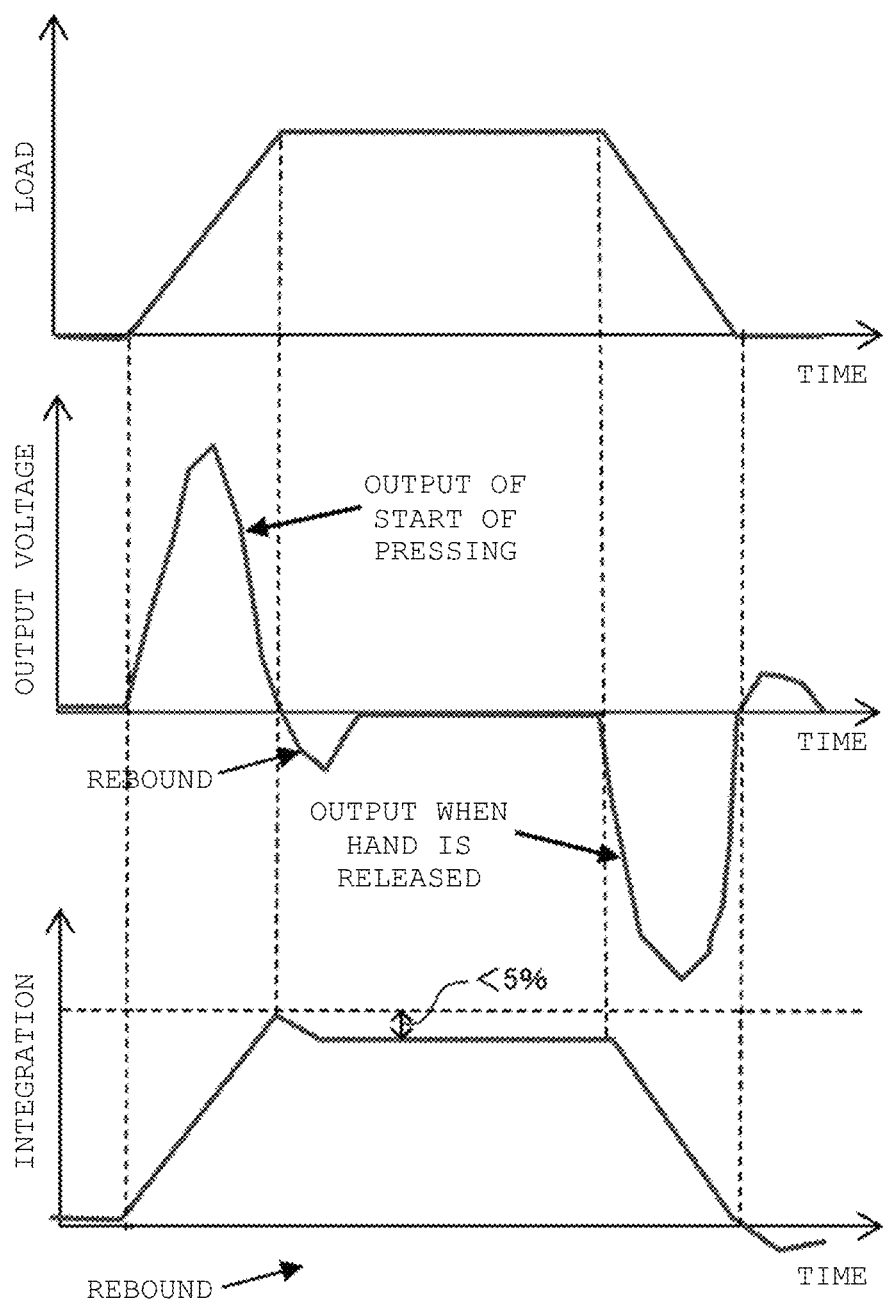
FIG. 9 is a diagram for describing a stress generated in a case where a user presses and holds a press sensor 112 according to the second embodiment.

Hereinafter, a press sensor 112 according to a second embodiment will be described. FIG. 8 is a graph illustrating a relationship between an elastic modulus of an adhesive material 22 according to the second embodiment and a rebound rate of an output. FIG. 9 is a diagram for describing a stress generated in a case where the user presses and holds the press sensor 112 according to the second embodiment. As illustrated in FIG. 8, the press sensor 112 is different from the press sensor 111 according to the first embodiment in that the elastic modulus $E_A$ of the adhesive material 22 satisfies $2\times10^4$ Pa$\leq E_A \leq 2\times10^5$ Pa. Therefore, the press sensor 112 will be described with reference to the differences from the press sensor 111, and the same points will not be described. Since the structure of the press sensor 112 is the same as that of the press sensor 111, the illustration is omitted.

The elastic modulus $E_A$ of the adhesive material 22 satisfies $2\times10^4$ Pa$\leq E_A \leq 2\times10^5$ Pa. As illustrated in FIG. 8, in a case where the elastic modulus $E_A$ of the adhesive material 22 satisfies $2\times10^4$ Pa$\leq E_A \leq 2\times10^5$ Pa, the rebound rate of the output is 10% or less.

As illustrated in FIG. 9, in a case where the user applies a load to the press sensor 112, the press sensor 112 rebounds and outputs a voltage having the opposite polarity to that in a case where the user applies the load to the press sensor 112. When the rebound rate of the output is 10% or less, the output of the opposite polarity due to the rebound is suppressed to 10% or less. Therefore, the press sensor 112 is less affected by the rebound than the press sensor 111, and can suppress the output of the opposite polarity.

Further, as illustrated in FIG. 9, in a case where the output from the press sensor 112 is integrated, the integral value corresponds to the load applied by the user. Since the rebound rate of the output is 10% or less, the decrease in integral value is within about 5%. In the press sensor 112, 5% is as large as the operation variation of the user, so that the press sensor 112 can have sufficient accuracy.

Further, a case where the press sensor 112 performs stepwise press detection will be described. For example, the maximum load when the press sensor 112 receives a press operation is set to 100%. The press sensor 112 is configured to discriminate load levels stepwise according to the magnitude of the load of the received press operation. For example, the press sensor 112 discriminates when the load of the received press operation is in three stages of 0% to 20%, 40 to 60%, and 80 to 100%, respectively. At this time, in the press sensor 112, the influence of the integral value by the rebound rate is within about 5%. Therefore, even in a case where the operation is performed stepwise, the detection ranges of the three stages of 0% to 20%, 40 to 60%, and 80 to 100% do not overlap. That is, even when the range of 0% to 20% in the first stage becomes a range of 0% to 25%, the range does not overlap a range of 35 to 60% in the second stage. Therefore, false detection can be prevented even in a case where press detection is performed stepwise.

Figure 10:
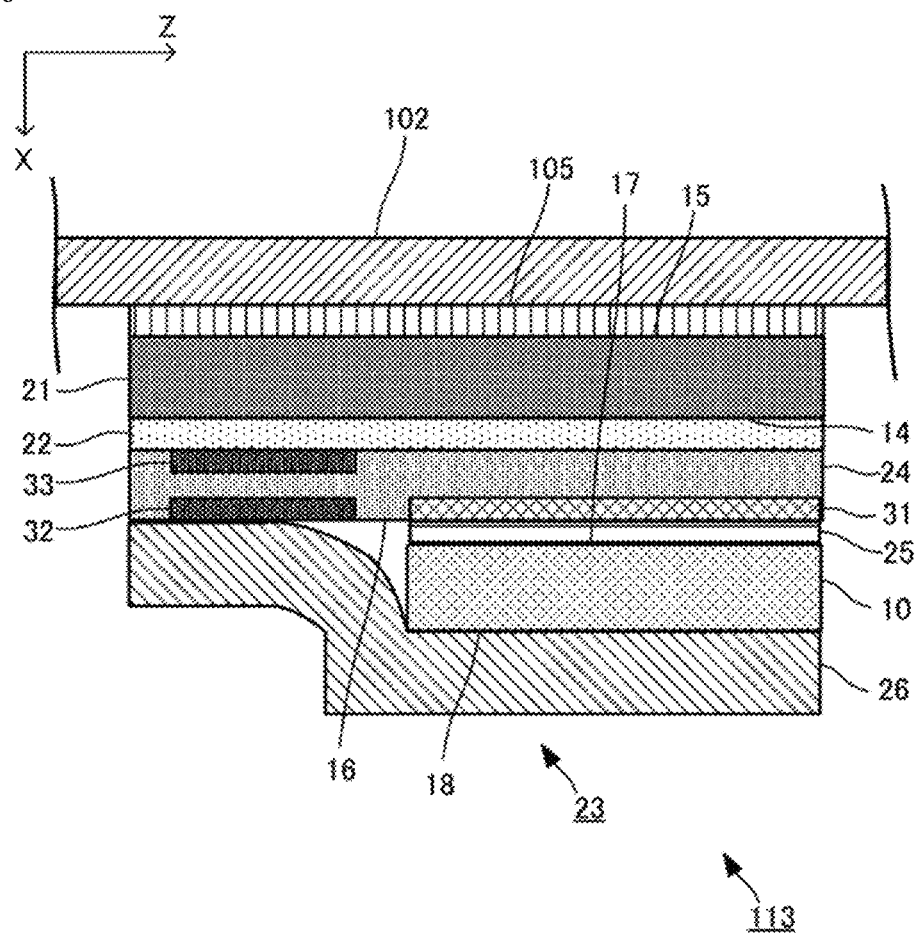
FIG. 10 is a schematic view for describing a section of a press sensor 113 according to a third embodiment.

Hereinafter, a press sensor 113 according to a third embodiment will be described. FIG. 10 is a schematic view for describing a section of the press sensor 113 according to the third embodiment. Note that in FIG. 10, wiring and the like are not illustrated. As illustrated in FIG. 10, the press sensor 113 is different from the press sensor 111 according to the first embodiment in that a ground electrode 33 is further provided. Therefore, the press sensor 113 will be described with reference to the differences from the press sensor 111, and the same points will not be described.

The press sensor 113 includes the ground electrode 33. The ground electrode 33 is arranged to face the ground electrode 32 with the sensor substrate 24 interposed therebetween. The ground electrode 32 and the ground electrode 33 are electrically connected to each other by, for example, a via electrode (not illustrated). For example, the via electrode is formed in a part of the sensor substrate 24 so as to penetrate the sensor substrate 24. The ground electrode 32 and the ground electrode 33 are not limited to those connected by the via electrode, and any device that conducts between the ground electrode 32 and the ground electrode 33 can be used.

In the press sensor 113, the adhesive material 22 has conductivity. Here, the reinforcing plate 21 is made of a metal material. Therefore, the ground electrode 33, the adhesive material 22, and the reinforcing plate 21 are electrically connected, and the reinforcing plate 21 becomes the ground electrode. The reinforcing plate 21 is provided on the housing 102 side of the electronic device 101 in the press sensor 113. That is, the reinforcing plate 21 is located between the signal electrode 31 and the housing 102 of the electronic device 101. As a result, the reinforcing plate 21 functions as a shield electrode, so that noise from the housing 102 side, that is, from the outside of the electronic device 101 can be suppressed.

Finally, the description of the present embodiment is illustrative in all aspects and should be considered as non-limiting. The scope of the present invention is indicated by the claims, rather than the above-described embodiments. Furthermore, the scope of the present invention includes the scope equivalent to the claims.

DESCRIPTION OF REFERENCE SYMBOLS

10: piezoelectric film
14: first main surface
15: second main surface
16: first main surface
17: first main surface
18: second main surface
21: reinforcing plate (board)
22: adhesive material (adhesive layer)
23: sensor unit
24: sensor substrate
25: adhesion layer
26: shield electrode
31: signal electrode
32, 33: ground electrode
61, 62, 63: neutral surface
101: electronic device
102: housing
103: surface panel
104: display unit
105: laminating material
111,112,113: press sensor
901: arrow

The invention claimed is:

1. A press sensor comprising:
a board;
an adhesive layer; and
a sensor unit on a first main surface of the board with the adhesive layer interposed therebetween, wherein the sensor unit includes:
  a sensor substrate having a first surface in contact with the adhesive layer and a second surface opposite the first surface;
  a signal electrode on the second surface of the sensor substrate;
  a first ground electrode on the second surface of the sensor substrate and arranged so as to not overlap the signal electrode;
  a second ground electrode on the first surface of the sensor substrate and arranged to face the first ground electrode with the sensor substrate interposed therebetween;

an adhesion layer on a surface of the signal electrode opposite the sensor substrate;

a piezoelectric film adhered to the signal electrode via the adhesion layer; and a shield electrode on a surface of the piezoelectric film such the piezoelectric film is between the shield electrode and the sensor substrate, the shield electrode also being in contact with the first ground electrode, wherein, when an elastic modulus of the board is $E_1$, an elastic modulus of the adhesive layer is $E_A$, and an elastic modulus of the sensor unit is $E_S$, $E_A < E_S$ and $E_A < E_1$.

2. The press sensor according to claim 1, wherein the adhesive layer has electrical conductivity.

3. The press sensor according to claim 1, wherein the board is made of a metal material.

4. The press sensor according to claim 1, further comprising a housing in which the press sensor is arranged.

5. The press sensor according to claim 4, wherein the press sensor is detachably attached to the housing.

6. The press sensor according to claim 1, wherein the press sensor is constructed such that during a pressing operation, a neutral surface of a stress against distortion in a stacking direction of the board, the adhesive layer, and the sensor unit is generated in each of the board, the adhesive layer, and the sensor unit.

7. A press sensor comprising:

a board;

an adhesive layer; and a sensor unit on a first main surface of the board with the adhesive layer interposed therebetween, wherein an elastic modulus $E_A$ of the adhesive layer is $7 \times 10^3$ Pa $\leq E_A \leq 5 \times 10^5$ Pa, and wherein the sensor unit includes:

a sensor substrate having a first surface in contact with the adhesive layer and a second surface opposite the first surface;

a signal electrode on the second surface of the sensor substrate;

a first ground electrode on the second surface of the sensor substrate and arranged so as to not overlap the signal electrode;

a second ground electrode on the first surface of the sensor substrate and arranged to face the first ground electrode with the sensor substrate interposed therebetween;

an adhesion layer on a surface of the signal electrode opposite the sensor substrate;

a piezoelectric film adhered to the signal electrode via the adhesion layer; and a shield electrode on a surface of the piezoelectric film such the piezoelectric film is between the shield electrode and the sensor substrate, the shield electrode also being in contact with the first ground electrode.

8. The press sensor according to claim 7, wherein the elastic modulus $E_A$ is $2 \times 10^4$ Pa $\leq E_A \leq 2 \times 10^5$ Pa.

9. The press sensor according to claim 7, wherein the adhesive layer has electrical conductivity.

10. The press sensor according to claim 7, wherein the board is made of a metal material.

11. The press sensor according to claim 7, further comprising a housing in which the press sensor is arranged.

12. The press sensor according to claim 11, wherein the press sensor is detachably attached to the housing.

13. The press sensor according to claim 7, wherein the press sensor is constructed such that during a pressing operation, a neutral surface of a stress against distortion in a stacking direction of the board, the adhesive layer, and the sensor unit is generated in each of the board, the adhesive layer, and the sensor unit.

* * * * *